Figure 1:
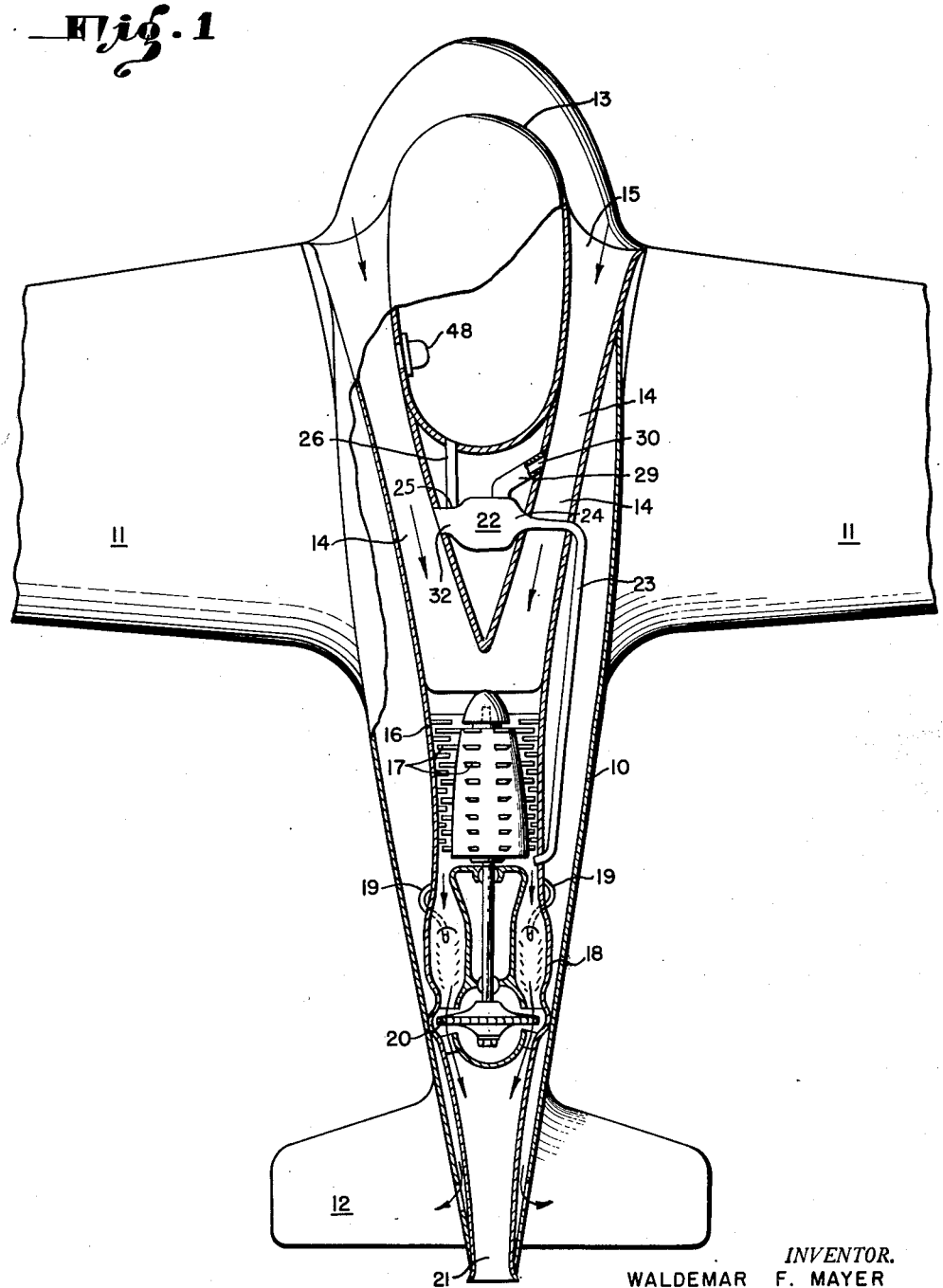

Jan. 8, 1952     W. F. MAYER     2,581,964
COOLING SYSTEM FOR AIR SUPPLIED
TO COMPARTMENTS OF AIRCRAFT

Filed March 16, 1945     2 SHEETS—SHEET 1

INVENTOR.
WALDEMAR F. MAYER
BY
ATTORNEY

Jan. 8, 1952     W. F. MAYER     2,581,964
COOLING SYSTEM FOR AIR SUPPLIED
TO COMPARTMENTS OF AIRCRAFT
Filed March 16, 1945     2 SHEETS—SHEET 2

INVENTOR.
WALDEMAR F. MAYER
BY
ATTORNEY

Patented Jan. 8, 1952

2,581,964

UNITED STATES PATENT OFFICE 2,581,964

COOLING SYSTEM FOR AIR SUPPLIED TO COMPARTMENTS OF AIRCRAFT

Waldemar F. Mayer, Los Angeles, Calif., assignor to The Garrett Corporation, Airesearch Manufacturing Company division, Los Angeles, Calif., a corporation of California Application March 16, 1945, Serial No. 583,054

7 Claims. (Cl. 62—136)

This invention relates to air conditioning systems for regulating the temperature of air delivered under pressure into an enclosure such as an aircraft cabin.

It is necessary to replenish the air in an aircraft cabin to replace oxygen consumed by cabin occupants. For higher altitude flying, it is also necessary to maintain, above a range of altitudes such as, for example, 8000 feet, a pressure in the cabin higher than that of the atmosphere. It is customary to employ a ram air intake for scooping up the air met with by the plane in flight, and for higher altitude flying, to employ supercharging means for increasing the pressure of the air delivered into the cabin. The work done by the ramming means in accelerating the air to cabin velocity, and the compressing action of the supercharger, heats the air to such an extent as to raise the temperature of the cabin to an uncomfortable level when the ambient air has a fairly high existing temperature.

The problem of cooling the air which is introduced under pressure into the cabin becomes one of prime necessity in connection with jet propelled aircraft adapted to operate at extremely high speeds and at very high altitudes. One of the objects of the invention is to meet this necessity by the provision of a cockpit pressurizing system for a jet propelled aircraft, incorporating means for cooling the air that is introduced under pressure into the cockpit.

Another object of the invention is to provide a pressurizing system which is not unduly complicated in construction. It is customary to incorporate in jet propelled aircraft an axial flow compressor driven by a gas turbine in the path of the jet propulsion gases, for compressing the air employed in the explosive mixture for the jet. One factor in the attainment of the last stated object is to bleed off a portion of the compressed air discharged from the axial flow compressor and to direct it to the cockpit for ventilating and pressurizing the same.

Another factor in the attainment of a pressurizing system embodying cooling mechanism which is not unduly complicated is utilization of the incoming air for cooling the air leaving the compressor, and avoiding the use of refrigerating mechanism, and in this respect, the invention has as a further object to provide a system for introducing into an enclosure, ventilating air under pressure, which system incorporates cooling mechanism utilizing the ventilating air itself as a refrigerant. More specifically, the invention aims to provide a system for pressurizing the air in an aircraft cabin, having means for cooling the air, which cooling means utilizes, as a coolant, the air entering the system through a rammed air inlet.

A further object of the invention is to provide a cooling system which utilizes the work absorbing effect of an air turbine to further cool the compressed air on its way to the enclosure to be ventilated, and to utilize the energy acquired by such turbine for assisting the circulation of coolant air through the heat exchanger or heat exchangers.

A further object of the invention is to provide an aircraft cabin air conditioning system which utilizes the heating effect of the compression of the air for heating the cabin air, and which employs cooling means to modify the heating effect so as to maintain a temperature which is comfortable for the occupants of the cabin.

Further objects and advantages of the invention will be brought out in the following part of the specification.

It is another object of my invention to provide mechanism for conditioning air for use in the cabin of an aircraft in which the air to be delivered to the cabin is placed under suitable pressure and is then brought into heat transfer relation with a flow of cooling air and in which the air to be delivered to the cabin is passed through a cooling turbine, the energy of which is used to drive a fan which acts on the flow of cooling air.

It is a still further object of my invention to provide a method of conditioning air for use in the cabin of an aircraft.

Figure 2:
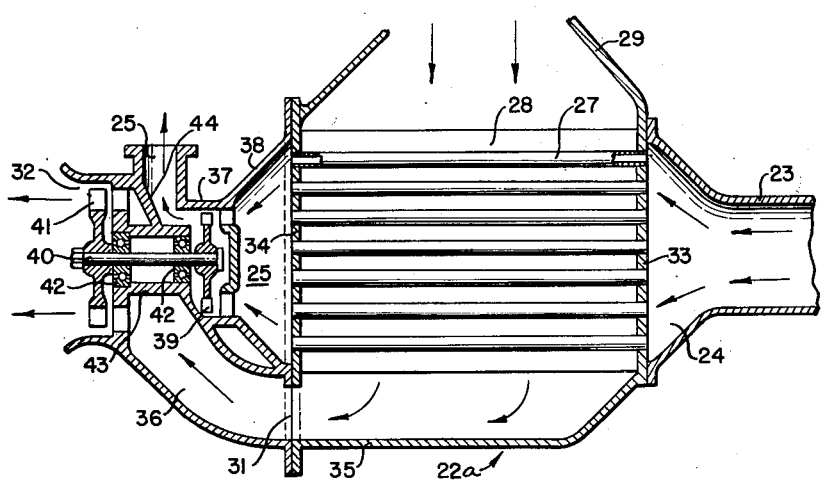

Referring to the drawing which is for illustrative purposes only,

Fig. 1 is a plan view of a portion of a jet propelled aircraft embodying the invention, with portions thereof broken away and shown in section to illustrate the invention; and Fig. 2 is a horizontal sectional view of a cooling apparatus embodying the preferred form of the invention.

As an example of one form in which the invention may be embodied, I have shown in Fig. 1 a fuselage portion of a jet propelled airplane, the fuselage being shown, largely in section, at 10, portions of the wing being shown at 11, tail stabilizing surfaces at 12, and the cockpit at 13. Disposed between the cockpit 13 and the wall of the fuselage 10 are a pair of ram air induction passages 14 having inlets 15 located in the leading edges of the root sections of the wing 11. The passages or ducts 14 converge and are joined to the forward end of the compressor chamber 16, in which is disposed an axial flow compressor 17. The rear end of the compressor chamber 16 is joined to the forward end of a combustion chamber 18 from which the burning gases, produced by combustion of the compressed air delivered thereto by the compressor 17 and fuel delivered thereto through fuel lines 19, are discharged through a gas turbine 20 and through the tail jet 21.

The present invention provides an air conditioning system particularly adapted for use in a plane such as that just described, although also adaptable for other types of aircraft. Such air conditioning system includes an air cooler, designated generally at 22, through which air under pressure from the discharge side of the compressor 17 is passed to the cockpit 13. From the compressor, the compressed air passes through a duct 23 to the inlet 24 (Fig. 2) of the cooler 22, and from the outlet 25 of the cooler, the cooled air is delivered through a duct 26 to the cockpit 13.

In its simplest form, the heat exchanger 22 may, as shown in Fig. 2 (in which it is referred to by the reference numeral 22a) comprise a series of passages 27, through which the compressed air is passed from the inlet 24 to the outlet 25, and a series of interspaces 28, through which the coolant air may be passed in heat exchange relation to the passages 27.

The coolant air is taken from one of the ram air induction ducts 14 by an induction tube 29 having an inlet 30 communicating with the duct 14, and is discharged from the cooler through a discharge passage 31 and an outlet 32, into one of the ducts 14.

The passages 27 may be in the form of tubes, the ends of which are mounted in headers 33 and 34 and forming therewith a heat exchanger core which may be formed as an independent unit and secured between the inlet 24 and outlet 25 by suitable flange connections of a conventional nature. The discharge passage 31 may be correspondingly formed in two sections—namely, a section 35 coextensive with the core and a section 36 extending around one side of the core outlet 25 and terminating in the coolant outlet 32.

Between the outlet 25 and the cooler core is an air turbine casing 37 which communicates with the discharge ends of the passages 27 through a header casing 38. The turbine casing 37 forms part of an air turbine 39, through which the compressed air, after being cooled, is passed to the outlet 25 and then to the cockpit 13. The turbine 39 abstracts work from the compressed air and thereby effects further cooling of the air as it leaves the cooler. The energy taken up by the turbine 39 is delivered, through a shaft 40 on which the turbine rotor is mounted, to an axial flow fan 41 disposed in the coolant outlet 32. The shaft 40 is journaled in bearings 42 which are mounted in a bearing casing 43 in the common wall 44 separating the compressed air outlet 25 and turbine casing 37 from the coolant outlet passage 31. The coolant outlet 32 is coaxial with the header casing 38 in order that the fan and turbine rotor both may be mounted on the respective ends of a common shaft.

The coolant is discharged through the outlet 32 into a duct 14, through which it enters the compressor 17.

The coolant inlet 30 and coolant outlet 32 are so positioned with reference to each other and with reference to the duct 14 that the pressure at the inlet 30 will be greater than the pressure at the outlet 32, and consequently a flow of air through the coolant passages 27 will be induced by the flow through the duct 14. However, this pressure differential is made low enough so that the fan 41 may do a substantial amount of work on the air flowing through the coolant passages, and thereby provide sufficient load upon the turbine 39 to permit the latter to effect its cooling function. In some cases the inlet 30 and outlet 32 may be so related to the duct 14 (e. g., by being located in identical spots in the respective ducts) that the fan 41 will carry the entire burden of moving the air through the coolant passages. This will give a maximum cooling effect in the turbine 39, but will tend to reduce the cooling effect in the cooler core because of slower circulation of the coolant.

The pressure of the air in the cockpit 13 is maintained at a desired level by a pressure regulating outlet valve 48 which may be of a type adapted to maintain the pressure in the cabin at atmospheric level until the plane has ascended to a predetermined height such as, for example, 10,000 feet, to then maintain the pressure in the cockpit at a fixed value while the plane ascends to higher levels until a second predetermined higher level such as, for example, 30,000 feet, is attained, and to thereafter reduce the pressure in the cabin in step with further reduction in ambient pressure, maintaining a predetermined pressure differential between the cockpit pressure and the ambient pressure, above said second predetermined level. The pressure differential selected is below the pressure delivered by the compressor 17, so that the latter may maintain a flow of air into the cockpit under all conditions.

Although I have described my invention and shown forms thereof adapted for use in aircraft and particularly jet propelled aircraft, it should be clearly understood that my invention is not limited to use in such aircraft and I wish it to be understood that the claims herein are not to be so limited but are to be broadly construed in accordance with the true scope and spirit of the invention as defined by the appended claims.

In the specification and in the claims various terms have been used. The air which is directed to the cabin or cockpit, or enclosures of the aircraft, is referred to as the "compressed" air, the "cooled" air, or "cabin" air. The flow of air which is passed through the coolers for the purpose of cooling the cabin air is referred to as "cooling" air. The terms "cabin" and "cockpit" have been employed in the specification and claims and it should be understood that these terms are used in their broad sense and refer to any space or enclosure wherein conditioned air is to be supplied. Also the term air is used in its broad sense and includes various gases.

I claim as my invention:

1. Mechanism for conditioning the air for use in an aircraft cabin comprising: a compressor, and a pair of ramming inlet ducts extending along the respective sides of said cabin and converging behind said cabin, for directing a flow of air to the inlet of said compressor; a cooler disposed between the rear of said cabin and said ducts, said cooler having passage means for the flow therethrough of air from the discharge side of said compressor and having other passage means for the flow therethrough of a coolant in heat exchange relation to said first mentioned passage, means for delivering compressed air from the discharge side of said compressor to said first mentioned passage means and from said first-mentioned passage means to said cabin, and means for directing a flow of air from one of said ducts to said second-mentioned passage means and from said second-mentioned passage means to the inlet of said compressor.

2. Mechanism for conditioning air for use in an aircraft cabin, comprising: a compressor and a pair of ramming air inlet ducts leading to the inlet of said compressor; a cooler disposed between said ducts, having passage means for the flow therethrough of compressed air from said compressor, and having other passage means for the flow of a coolant in heat exchange relation to said first-mentioned passage, means for directing a flow of compressed air from said discharge side of said compressor to said first-mentioned passage means and from said first-mentioned passage means to said cabin, and means for directing a flow of air from one of said ducts into said second mentioned passage means and from said second mentioned passage means into the other of said ducts.

3. Mechanism for conditioning air for the cockpit located in the forward region of the fuselage of the aircraft comprising: a pair of rammed air inlet ducts disposed one on either side of the fuselage, said ducts converging rearwardly, a compressor including a casing, the forward end of which is joined to the rear ends of said ducts, a cooler disposed between said ducts, having passages for the flow therethrough of compressed air from said compressor and having interspaces for the flow of a coolant in heat exchange relation with said passages, means for directing a flow of compressed air from the discharge side of said compressor to the passages and from said passages to said cockpit, and means for directing a flow of coolant air from one of said rammed air inlet ducts to said interspaces and from said interspaces to the other of said ducts.

4. Mechanism for conditioning air to be supplied to the cockpit of an aircraft comprising: a combustion chamber, an air compressor for delivering air to said combustion chamber for supporting combustion therein, duct means extending along the respective sides of said cockpit, converging behind said cockpit, and discharging into said compressor, a cooler disposed between the rear of said cockpit and said converging portions of said duct means, said cooler having passages for the flow therethrough of compressed air from said compressor and having interspaces for the flow therethrough of a coolant air, means for diverting a portion of the air flowing through said duct means into said interspaces for cooling the air flowing through said passages and then discharging said coolant air into said duct means, and means for delivering compressed air from the discharge side of said compressor to said passages and then from said passages to said cockpit.

5. Mechanism as defined in claim 3 including a turbine disposed in the outlet of said cooler passages for abstracting heat energy from the compressed air passing therethrough and thereby further cooling the compressed air after the initial cooling in said passages, and means including a fan receiving driving power from said turbine for circulating through said interspaces a portion of the air on its way to the inlet of said compressor.

6. In mechanism for conditioning air which is to be delivered to an enclosure of an aircraft: a heat exchanger having first passage means for said air and second passage means for coolant air; means for delivering air under pressure to the inlet of said first passage means; means for delivering coolant air to the inlet of said second passage means; and an air cooling unit, said cooling unit having a first duct connected to the outlet of said first passage means and being adapted for connection to said enclosure and a second duct connected to the outlet of said second passage means, said ducts being separated by a common wall means, and said cooling unit comprising a rotary energy conversion member exposed to the coolant air in said second duct means, a power and heat absorbing turbine in said first duct means to further cool the air which moves therein, and drive means extending from said first duct means through said common wall means into said second duct means, and connecting said energy conversion member and said turbine.

7. In combination in an aircraft: a gas turbine and an air compressor for delivering air thereto under pressure; a ram air induction passage means fo delivering ram air to said compressor; a duct connected on the downstream side of said compressor and on the upstream side of said turbine for delivering a portion of the compressed ram air to an enclosure of the aircraft; an air cooler in said duct for cooling the air to be delivered to said enclosure; a coolant air induction tube for conducting a portion of said ram air from said ram air induction passage means through said air cooler in heat transfer relation to the air to be delivered to the enclosure, the inlet of said coolant air induction tube being connected to said ram air induction passage means, and the outlet of said coolant air induction tube being connected to said ram air induction passage means downstream from the said inlet of the induction tube; an air turbine in said duct on the downstream side of said air cooler; and air pumping means driven by said air turbine and positioned in said coolant air induction tube downstream from said air cooler for pulling ram air through said coolant air induction tube and said air cooler.

WALDEMAR F. MAYER.

REFERENCES CITED

The following references are of record in the file of this patent:

UNITED STATES PATENTS

| Number | Name | Date |
|---|---|---|
| 2,085,761 | Lysholm | July 6, 1937 |
| 2,162,956 | Lysholm | June 20, 1939 |
| 2,304,151 | Crawford | Dec. 8, 1942 |
| 2,367,223 | Larrecq | Jan. 16, 1945 |
| 2,391,838 | Kleinhans | Dec. 25, 1945 |

FOREIGN PATENTS

| Number | Country | Date |
|---|---|---|
| 23,529 | Great Britain | Nov. 3, 1908 |